W. M. WHITE.
APPARATUS FOR UTILIZING THE HYDRAUCONE ACTION OF WATER.
APPLICATION FILED JULY 6, 1915. RENEWED JAN. 25, 1917.

1,223,843.

Patented Apr. 24, 1917.
3 SHEETS—SHEET 1.

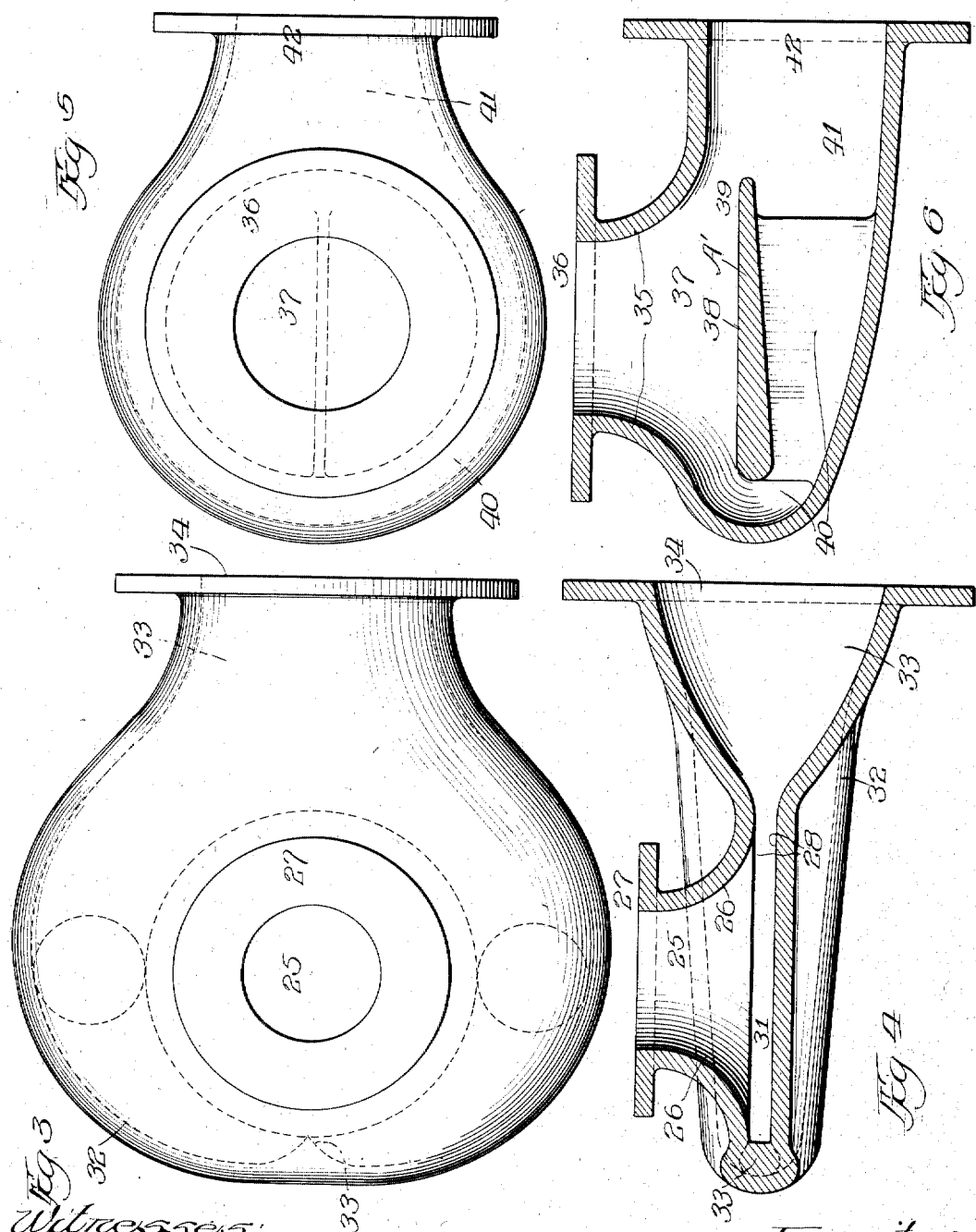

W. M. WHITE.
APPARATUS FOR UTILIZING THE HYDRAUCONE ACTION OF WATER.
APPLICATION FILED JULY 6, 1915. RENEWED JAN. 25, 1917.
1,223,843.
Patented Apr. 24, 1917.
3 SHEETS—SHEET 3.
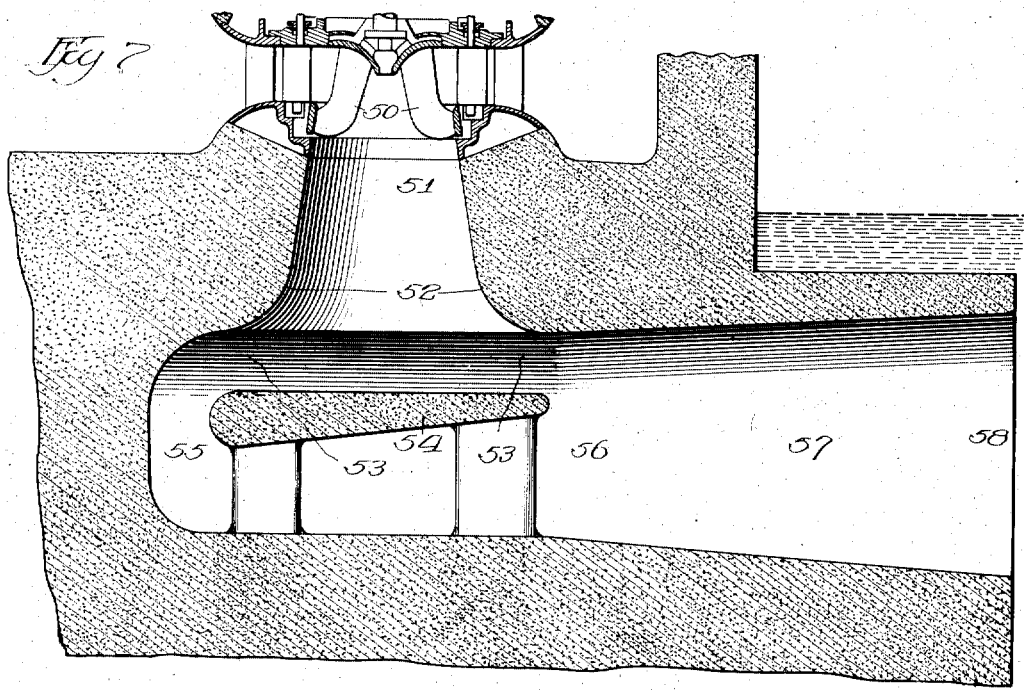
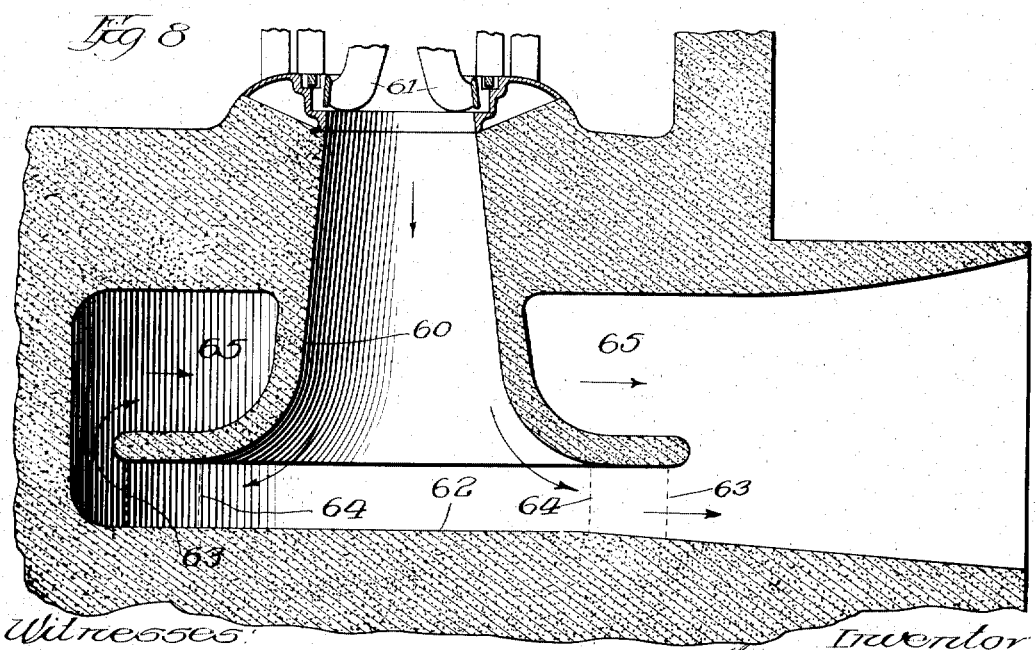

UNITED STATES PATENT OFFICE.

WILLIAM M. WHITE, OF MILWAUKEE, WISCONSIN.

APPARATUS FOR UTILIZING THE HYDRAUCONE ACTION OF WATER.

1,223,843. Specification of Letters Patent. Patented Apr. 24, 1917.

Application filed July 6, 1915, Serial No. 38,373. Renewed January 25, 1917. Serial No. 144,549.

*To all whom it may concern:*

Be it known that I, WILLIAM M. WHITE, a citizen of the United States, residing at Milwaukee, in the county of Milwaukee and State of Wisconsin, have invented certain new and useful Improvements in Apparatus for Utilizing the Hydraucone Action of Water, of which the following is a specification.

The invention relates to means for guiding and controlling the action of a body of water flowing through a conduit.

The invention designs more particularly to provide means for regaining pressure from velocity by utilizing what I have termed the "hydraucone action" of water as hereinafter described.

The invention further designs to provide a more improved means for changing the direction of water flowing through a closed conduit than that shown in my copending applications Serial Nos. 769,791, filed May 26" 1913 and 774,527 and 774,528 both filed June 19" 1913.

The invention further designs to provide a device of the character described in combination with a flaring tube to regain pressure from velocity of water.

The invention further designs to utilize this hydraucone action of water in a chamber for regaining pressure from velocity.

The invention further designs to provide a device for changing the direction of a body of water flowing through a closed conduit in as short a distance as possible and with regain of pressure from velocity by utilizing the hydraucone action of water in power plant construction, where the cost and difficulty in excavation beneath the power house for the draft tube are important factors. The invention further designs to provide a means for changing disturbed flow of water into smooth flow, for the purpose of securing the greatest regain of pressure from velocity.

The invention consists in the several features hereinafter set forth and more particularly defined by claims at the conclusion hereof.

In the drawings:

Fig. 3 is a plan view of the construction shown in Fig. 4;

Fig. 4 is a section through a hydraucone regainer, showing the collecting chamber located at the discharge of the conoidal chamber;

Fig. 5 is a plan view of the construction shown in Fig. 6;

Fig. 6 is a sectional view through a hydraucone elbow;

Fig. 7 shows the application of a hydraucone elbow and regainer to a water power plant, and Fig. 8 shows a modified form of application of the hydraucone to a water power plant.

Before entering into a detailed description of the invention, I shall describe and explain what I have termed the hydraucone action of water. When a stream of water impinges against a flat surface, the water is deflected therefrom in all directions and in its deflection assumes a certain well defined shape. By the term "hydraucone action" of water, I mean that action of the water which occurs as the stream impinges against a surface and is deflected therealong.

I have found by actual experiment that water impinging against a surface forms itself into a frusto-conoidal shape on said surface and, in the case of a free smooth circular jet impinging upon a plane surface, at right angles to the axis of the jet, the shape of the outer surface of the conoid is symmetrical about the axis of the jet in the direction of flow; and the radius of curvature of the outer surface of the conoid is substantially the same dimension as the radius of the circular jet; the thickness of the stream, as it issues radially in all directions from the base of the conoidal body is such as to give substantially the same cross-sectional area of discharge as the cross-sectional area of the jet at entrance. It is to be noted that the cross-sectional area of the conoidal body is greater at all points than at entrance or discharge. Along this greater area or within this greater capacity there occurs that action of the water which I have termed the "hydraucone action."

That portion of the stream which forms itself into a frusto-conical body as the jet impinges on the plate, I term a "hydraucone".

The velocities and pressures in stream filaments symmetrical about the axis of the hydraucone at points diametrically opposite each other are the same.

Figure 1:
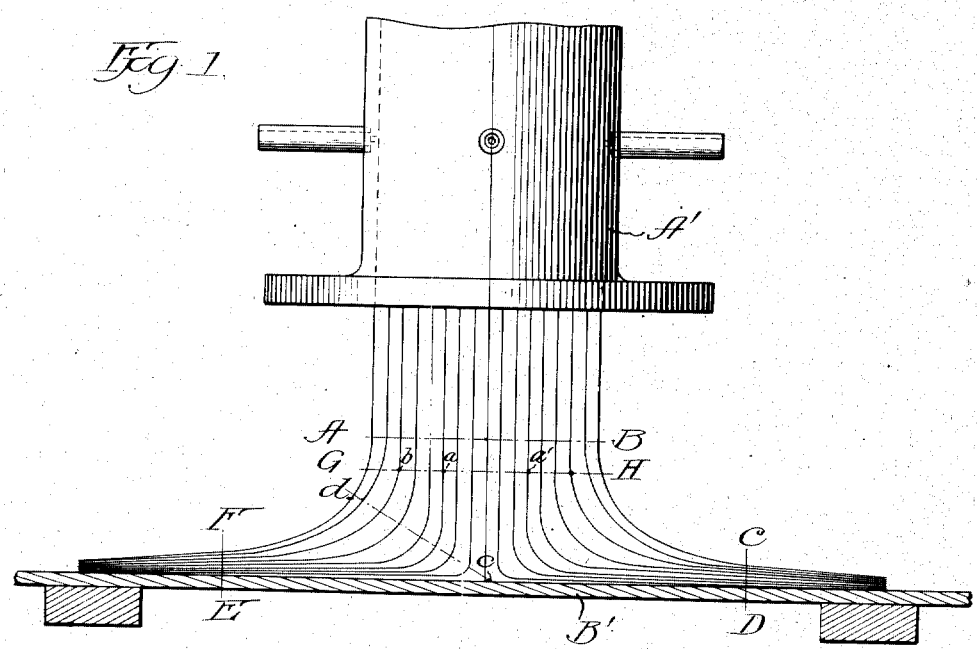
Figure 1 is a diagram illustrating a free hydraucone.

In the case of a circular jet, shown in Fig. 1, the stream of water issues from a pipe A′, falls through a distance and strikes a plate B′. The hydraucone is shown by the portion A—B—C—D—E—F—, A—B being a plane passed through the stream at right angles to the jet and at a point just before the impinging action is apparent. In considering any plane parallel to the plate as G—H, I find that the velocities and the pressures in the filaments lying in that plane and which are equidistant from the center of the jet are substantially equal, i. e., the pressure and velocity at "$a$" is equal to the pressure and velocity at "$a^1$". This is also true of the pressures and velocities in the plane coincident with the plate. Though the velocities and the pressures of the filaments equidistant from the axis of the jet are equal, under the conditions imposed above, the velocities and pressures of the filaments at different distances from the axis throughout any plane, such as G—H, are unequal, the velocity at "$b$" is greater than that at "$a$", and the pressure at "$b$" is less than that at "$a$", and the pressure decreases from the center of the hydraucone to the outer surface as the velocity increases.

Another action of the hydraucone to be noted is that the velocities and pressures of particles of water moving along the filaments of stream flow, represented by the curved lines drawn through the points "$a$" and "$b$", are constantly changing throughout their course through the hydraucone from point of entrance, through the plane A—B, to point of exit C—D, E—F. At entrance of the hydraucone through the plane A—B, the velocity is a maximum and the pressure is a minimum. Along a common path normal to the paths of all of the filaments of flow, represented by the line "$c$"—"$d$", the pressures are greatest and the velocities least. At the discharge from the hydraucone the pressures have been reconverted into velocity, and the velocities and pressures of the filaments of flow have been restored to substantially what they were at entrance to the hydraucone through the plane A—B. This is true for all the filaments, except those at the surface where the velocity continues the same as the velocity of the jet, and those at the axis of the jet where the velocity gradually changes into pressure until at the point "$c$" where it strikes the plate the velocity equals zero, and the pressure is equal to the velocity head of the jet.

It will be noted that a considerable pressure is maintained at the center of the base of the conoidal mass although the surface of the conoid is at atmospheric pressure or at least the same pressure as the surface of the free jet. This pressure is maintained by the action recited above and by the counter pressure due to the centrifugal force of the water flowing through the conoid, in changing its direction from axial to radial. The summation of the pressures exerted by the centrifugal force of the water along a line drawn from the point of intersection of the axis of the jet and plate to the surface of the conoidal mass of water and normal to the filaments of flow, will be equal to the pressure at center of the base of the conoidal mass.

A further experimental discussion and explanation of the action of water impinging on a plate will be found in "*The Journal of the Association of Engineering Societies*", vol. 27, p. 39.

In the hydraucone action of water it was found that at the planes C—D and E—F the stream lines of water across these planes were flowing at substantially equal velocities.

The hydraucone action of water also illustrates the action of water in turning through the shortest possible angle and flowing directly away from the turning surface without additional pressure and unnecessary loss.

Having in mind the hydraucone action of the water it occurred to me to utilize the hydraucone, its characteristics and shape in connection with devices for regaining pressure from velocity, so that I could make this regain in the shortest possible distance measured in the direction of the inflowing stream.

To accomplish these purposes a conoidal chamber, having an axial inlet and a radial outlet adjacent the impinging surface was formed for inclosing the water undergoing this action.

The conoidal walls of the chamber were made to inclose a greater volume than that required to correspond to the shape of a free hydraucone. When the free hydraucone is inclosed in a conoidal chamber the friction of the water along the conoidal walls, retards the velocity of the outer filaments of the water and the pressure exerted by the centrifugal force of these filaments of water, in changing their direction, is decreased.

The reason the conoidal chamber was increased in capacity over that capacity corresponding to a free hydraucone was to cause a pressure to be exerted by the centrifugal force of the added filaments of water to compensate for the decrease in pressure due to the decreased velocity of the filaments as outlined above. In other words, I maintain a summation of pressures along a line normal to the curved paths of the filaments of flow through the inclosed hydraucone, equal to the velocity head of the stream at entrance to the chamber. In this way I maintain a pressure along the conoidal wall substantially equal to the pressure along the surface of the stream at entrance to the inclosed hydraucone.

The decrease in the velocity of the stream filaments along the conoidal walls also made it necessary to provide, in the discharge from the conoidal chamber, a greater capacity than the corresponding capacity of discharge from a free hydraucone, in order to preserve the same decrease in pressure from center of base to exit along the base of the inclosed hydraucone as exits along the base of the free hydraucone; consequently the distance from the lower face of the conoidal wall to the surface of the impinged plate was increased over the corresponding distance of the free hydraucone.

By making the capacity of the inclosing conoidal chamber greater in amount, as stated above, than that required to correspond to the form of a free hydraucone, I maintain substantially equal pressure along the conoidal walls from entrance to discharge. In other words, it may be said that I maintain normal conditions of flow, and have produced an inclosed hydraucone having the same characteristics as a free hydraucone.

I found that the water discharged from the inclosed hydraucone flowed at substantially equal and parallel velocities and that this feature is useful for accomplishing greatest regain of pressure from velocity in radially extending passages communicating with the discharge of the conoidal chamber, increasing in capacity in the direction of flow.

Having provided an inclosed hydraucone having the characteristics of a free hydraucone, one of which characteristics is the maintaining of the pressure along the surface of the conoidal walls the same as the pressure of the surface of the stream at entrance, I formed another conoidal chamber, which I have termed the hydraucone regainer by forming the walls of this chamber of slightly increasingly greater capacity in the direction of flow than the walls provided for containing the inclosed hydraucone, and thus providing an angle of divergence of the walls of the chamber from that of the natural shape of the inclosed hydraucone, substantially the same as the angle of divergence of the walls of a Venturi tube having good efficiency, and thus caused the velocity of the water to be checked in the greater capacity provided, with consequent regain of pressure, in accordance with Bernouilli's law.

As a further requirement for the regain of pressure from velocity the discharge outlet from the conoidal chamber was gradually increased from that of an inclosed hydraucone to form the walls of the outlet of slightly increasingly greater capacity in the direction of flow for regain through the discharge on the same principle as the Venturi tube.

By means of the hydraucone chamber of increasingly greater capacity than that required for an inclosed hydraucone having characteristics of a free hydraucone, I was enabled to regain pressure from velocity with good efficiency in a short distance, measured in the direction of the motion of the water at the entrance to the chamber, which has a useful application in water power plants, and other useful applications.

The results outlined above may be obtained to a modified extent by shaping the base of the conoidal chamber either concave, convex or angularly inclined, provided that the inclosing walls be made of greater capacity than that corresponding to the surface of the free hydraucone formed by the stream impinging upon the modified form of base and provided that due allowance be made for the effect of decrease of velocity due to the friction of the water on the surface of the conoidal chamber as recited, and the inclosing walls be made to slightly diverge for the purpose as stated.

Figure 2:
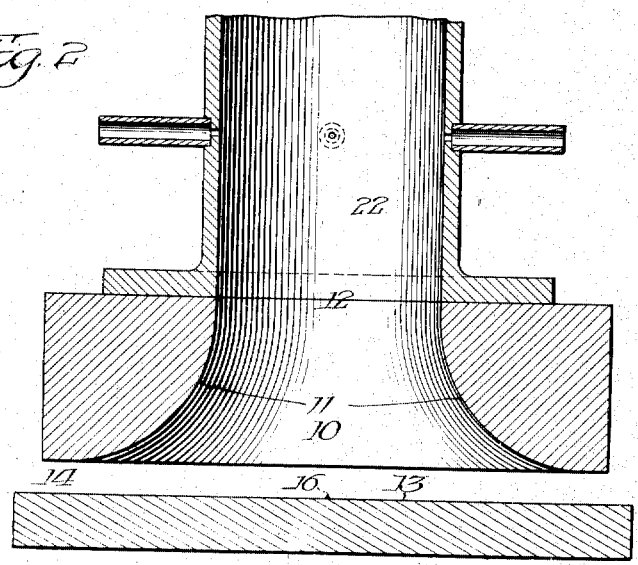
Fig. 2 is a section through a hydraucone chamber.

Conforming to the above requirements for adapting a free hydraucone to the purposes set forth, I have shown in Fig. 2 a hydraucone chamber 10, of gradually increasing capacity, having a conoidal shaped wall 11, circular inlet 12, plate 13, and annular discharge 14, from which the water is deflected in all directions.

The curvature of the walls 11 bears such ratio to the diameter of the inlet that the water will cling to the outer surface of the chamber and not recede and form a free hydraucone within the chamber. That filament of pressure at the center of the supply pipe 22 flows substantially to the center of the deflecting plate at 16, and in passing therethrough its pressure is gradually increased and its velocity is decreased to practically zero at the point 16, but as it is deflected from that point along the plate and passes from higher to lower pressures, its velocity is increased so that the energy of the particle remains substantially constant. By means of the hydraucone I am causing the water to be turned by pressure from within and by turning the water in all directions I avoid difference of centrifugal force on adjacent filaments of stream flow of equal radii, so that I avoid cross currents which cause eddies and whirls and a loss of energy. By means of the hydraucone chamber I am enabled to change the direction of the water in closed conduits with less loss of energy than has heretofore been attained, and through shorter distance measured in the direction of motion of the inflowing stream than has been done heretofore. With this general shape, shown in Fig. 2, as a basis, numerous devices may be evolved therefrom and combined therewith to accomplish the objects of this invention.

In Figs. 3 and 4, I have illustrated a device for utilizing the hydraucone action of water which I term the hydraucone regainer, and which may be used to good advantage in connection with centrifugal pumps where the high velocity of water discharged from the volute casing may be transformed into pressure for useful work in a short distance measured in the direction of motion of the water as it leaves the pump casing. This has a useful application in large pumping plants where the piping within the station is necessarily limited to the walls of the station and short turns are necessary in connection with centrifugal pumps. Bends made with the usual form of elbow of unvarying cross-section cause the velocity head discharged from the pump to be dissipated in whirls and eddies. A further and more complete discussion of the disadvantages of the elbow of unvarying cross-section will be found by reference to my copending application, Serial No. 22232, filed April 19th, 1915. The device of Figs. 3 and 4 consists of a hydraucone chamber 25 having conoidal walls 26, an inlet 27, an impinging surface, a flat plate portion 28 which is spaced away from the conoidal walls of the chamber to form an annular discharge 31, 31, 31, opening radially in all directions. An inclosing casing 32 forms a receiving chamber 33 for the water issuing from the annular discharge, which chamber gradually converges to its discharge outlet 34. The receiving chamber 33 also is of gradually increasing capacity in the direction of flow to cause the regain of pressure from velocity. The area of the annular discharge 31 is made greater than the area at entrance 27 and the radius of curvature of the conoidal walls 26 is such as will provide a conoidal chamber of slightly increasingly greater capacity than that required for the shape of the inclosed hydraucone as previously described. With this chamber of gradually increasing capacity in the direction of flow, the water is turned with greatest pressure at the smallest possible angle without internal disturbance and its velocity is gradually decreased with a resulting increase in pressure.

In Figs. 5 and 6 I have shown a means for utilizing the hydraucone action of water in an elbow for the purpose of changing the direction of water in a closed conduit with short radius of curvature with less loss than exists with the present form of short radius elbows. This device consists of conoidal walls 35 flaring outwardly in the direction of flow from the inlet 36 to form a hydraucone chamber 37 provided with a deflecting plate 38 located across the discharge 39 adjacent the curved walls and within the bend, the curved walls extending over and around the plates forming with it a chamber having a discharge at right angles to entrance, the plate being spaced from the end of the elbow and from its bottom to form a continuous passage 40 therearound and therebeneath, the discharge 41 communicating with the discharge end 42 of the elbow. By the formation of the hydraucone within the elbow the water is caused to change its direction in a short space without the disturbing effects produced by the difference in pressures caused by the centrifugal force of the water in an elbow of unvarying cross-section.

One of the most important objects of my invention, as I have stated, is the employment of the inclosed hydraucone in power plant construction. Here it has useful application with water wheels, and particularly water wheels of the single runner vertical Francis type. In plants using this type of wheel, the runners are usually of large capacity, handling large volumes of water, so that the conduits from the runner have of necessity to be of large dimensions. In order to turn the water through such a conduit and discharge it into the tail race or discharge it from underneath the power house such curved conduit requires expensive excavation for instalment. By use of the inclosed hydraucone, I am enabled to avoid losses which occur in curved conduits of unvarying cross-section and regain pressure from velocity with high efficiency and at the same time avoid expensive excavation, since I am regaining pressure from velocity within a short distance below the water wheel runner. My preferred form of conoidal chamber for this purpose is one of gradually increasing capacity from that of an inclosed free hydraucone such as will produce the centrifugal force and regain as previously set forth, and a substantially flat plate forming the base of the chamber below the discharge and extending beyond the chamber, said plate being disposed in a collecting chamber which is located at and around the outlet from the conoidal chamber for the purpose of collecting water and permitting it to be discharged over and under said plate and from one side of the conoidal chamber. This preferred shape is substantially the same as the hydraucone elbow previously described, but is preferably made of concrete in power plant construction and forms a section of the conduit. This hydraucone elbow above described may be used to advantage in combination with the discharge conduits from a water wheel, where I may employ a straight section of conduit or a flaring section increasing in capacity in the direction of flow, either of which forms of sections are coaxial with that of the hydraucone chamber and the axis of rotation of the runner and either a straight section or flaring section increasing in capacity in the direction of flow at the discharge end of the elbow. In Fig. 7 I have shown one of the forms outlined above, in which the hydraucone elbow may be used in a water power plant. The water wheel runner 50 discharges into a vertically extending section of receiving conduit 51, increasing in capacity in the direction of flow, which conduit is flared at its end into a hydraucone chamber 52 and is provided with an annular discharge outlet 53 from the hydraucone, a substantially flat plate 54 forming the base of said hydraucone, a collecting chamber 55 surrounding said plate and communicating with said chamber 52 and which causes the water to flow over, around and under said deflecting plate and an outlet 56 communicating with the chamber 55 at an angle to the chamber 52, which outlet communicates with a discharge passage 57 of increasing capacity in the direction of flow through the discharge to the tail-water at 58. It is to be noted that the chamber 52, outlet 53, plate 54, collecting chamber 55, outlet 56, form a hydraucone elbow similar to that shown in Figs. 4 and 5 but in concrete. It is to be understood that the structure shown in concrete in Fig. 7 could be constructed from sections of pipe and that a straight section could be used above and communicating with the receiving conduit 51.

Another form of the device, Fig. 8, is the flaring of the end of the discharge pipe 60, connecting with the runner 61, said flare of such shape as to conform to the hydraucone regainer, a deflecting plate 62 located or disposed opposite to the discharge of the conduit from the runner, an annular passage 63 of increasing capacity connecting with the discharge 64 of the conoidal chamber, and a collecting chamber 65 located around the plate so that the water discharged from the hydraucone would pass out, around and above said plate.

These devices have useful application in water power plants, for the reason that they afford a means of regaining pressure from velocity: first, in the flaring section of pipe from the runner; second, in the hydraucone regainer as described; third, regaining velocity in the radially extending passage or discharge from the hydraucone; and fourth, a further regain of velocity in the expanding passage connecting with the collecting chamber. By this method I am enabled to turn the water from the water wheel runner at substantially right angles from its direction at discharge without loss due to eddies and whirls and discharge it into the tail race, and regain pressure from velocity with the greatest efficiency and by turning it through the shortest possible angle at which it will flow away without disturbance and unnecessary losses, avoid expensive excavation.

The water discharged from a water wheel runner is in a greatly disturbed state, due to the friction of the guide vanes, the shock which it encounters at entrance to the runner vanes, and to the friction along the numerous wheel vanes, due also to the disturbing action of pressures and counter-pressures within the runner. In order to regain pressure from velocity with good effect, it is essential that the water be flowing in substantially parallel stream lines of equal velocity as set forth in my copending application, Serial No. 22232, filed April 19th, 1915.

It has been stated above that the energy in the water entering the hydraucone is changed from velocity at entrance to pressure at the base and again changed from pressure at the base into velocity at the discharge from the hydraucone.

The energy of the water discharged from the water wheel in velocity is transformed into pressure at the base of the hydraucone. This transformation of velocity into pressure destroys the eddies, whirls and disturbed condition of the water, conserves the energy of these eddies and whirls which, otherwise, would not only go to waste, but would prevent proper regain of pressure from velocity in any other form of regaining device.

The energy of the water at the base of the hydraucone is again transformed into velocity, but the eddies having been dissipated, the water flow from the hydraucone in parallel streams is in proper condition for greatest regain of pressure from velocity in the radially expanding passage, as described.

I have mentioned an annular outlet for the discharge of the water from the conical conduits and conoidal chambers, but I do not limit myself to a continuous annular opening; by an annular opening, under this specification, I mean an opening of essentially greater dimension circumferentially than axially, and especially such an opening as will permit the water to be discharged radially to the axis of the water wheel and permit of reasonably close proximity of the ends of the said conduits and said conoidal chamber, and at the same time accommodate the water discharged from the water wheel.

In the drawings, I have shown the hydraucone chamber with flat bottom for an impinging surface, but such impinging surface may be conical, convex or concave, but is preferably concentric with the axis of the entering stream. The shape of the free hydraucone may be different depending upon the particular form of base used. I make the walls of the chamber to a shape which provides an inclosed conoidal chamber and preferably of slightly increasingly greater capacity in the direction of flow than that required to conform to the shape of the free hydraucone which would tend to form on impact with the particular form of base used. Some beneficial effect is obtained when the walls of the inclosing chamber are such as to provide an outlet from the conoidal chamber of greater capacity than the inlet at the apex, even though the walls be not made of slightly increasingly greater capacity throughout the entire length of the conoidal chamber.

The invention thus exemplifies first, the utilization of what I have termed the "hydraucone action of water", by forming a chamber for the water undergoing this action, the capacity of which chamber is slightly increased from that of a free hydraucone to provide for the friction of water next to the walls of the chamber so that a hydraucone with all the characteristics of a free hydraucone may be maintained therein; second, by further increasing the capacity of this inclosed hydraucone chamber and yet preserve the hydraucone action of the water therein, to regain pressure from velocity; third, as a consequence of the formation of this chamber by increasing the distance of the walls of the chamber from the deflecting plate to form a discharge of greater capacity than that of entrance, to the chamber (a) to accommodate for the friction of the water and (b) to cause a further regain of pressure and (c) a discharge of the water from the chamber in stream lines of substantially equal velocity; and fourth, by forming the chamber as above described to turn the water through a small angle without loss due to eddies and whirls, for the reason heretofore specified.

The invention is not to be restricted to the use of the hydraucone action of water in the devices above described but may be varied so as to be within the scope of appended claims.

By water wheel under the present specification and claims, I mean a water wheel, hydraulic turbine or any hydraulic power producing apparatus having a runner of such form as to cause the water to be discharged from it preferably axially to the rotation of the runner, and I mean especially any hydraulic power apparatus which may be used with my invention for the accomplishment of the results claimed. One type of a water wheel in the meaning of the specification and claims is illustrated in the drawings.

I claim:

1. A hydraucone chamber for the purpose described, formed by a casing having conoidal walls of increasingly greater cross-sectional area in the direction of flow than that required to inclose a free hydraucone, substantially as described.

2. In a conduit, the combination of a casing having side walls shaped to form a frusto-conoidal chamber, a deflecting plate forming the bottom of said chamber, said walls being spaced from said plate to form a discharge outlet for the water in said chamber whereby the direction of flow of the water passing from the open end to the bottom of the chamber is changed from axial to radial without unnecessary losses, and issues from said discharge in stream lines of substantially equal velocity, substantially as described.

3. As a device, conoidal walls inclosing a chamber having a circular inlet and an annular outlet and a substantially flat base, the radius of curvature of the conoidal walls being such as to maintain within the chamber reactions of a free hydraucone, substantially as described.

4. A hydraucone regainer comprising a casing having an axial entrance and side walls shaped to form a frusto-conoidal chamber, a deflecting plate forming the bottom of said chamber, said walls being of slightly increasingly greater capacity than that required to inclose a hydraucone and being spaced away from said plate to form a discharge outlet of greater capacity than that at entrance, whereby the direction of flow of the water is changed from axial to radial without unnecessary losses and for the regain of pressure from velocity, substantially as described.

5. The combination, with a frusto-conoidal chamber and a plate disposed adjacent thereto against which the water passing through said chamber impinges and is directed radially therefrom in all directions, of a collecting chamber surrounding said plate and communicating with said conoidal chamber, substantially as described.

6. The combination, with a frusto-conoidal chamber of slightly increasingly greater capacity than that required to inclose a free hydraucone and a plate disposed adjacent thereto against which the water passing through said chamber impinges and is directed radially therefrom in all directions, of a collecting chamber surrounding said plate and communicating with said conoidal chamber, whereby the pressure of the water in the collecting chamber is increased and its velocity decreased, substantially as described.

7. The combination, with a water wheel, of a discharge conduit leading from said wheel including a frusto-conoidal chamber, a plate disposed adjacent thereto against which the water passing through said chamber impinges and from which it is deflected, and a collecting chamber surrounding said plate and communicating with said conoidal chamber, substantially as described.

8. The combination, with a water wheel, of a discharge conduit leading from said wheel including a hydraucone regainer, and a collecting chamber for said regainer, substantially as described.

9. The combination, with a water wheel, of a discharge conduit leading from said wheel including a frusto-conoidal chamber, a collecting chamber located below and communicating with said conoidal chamber, and a plate disposed in said collecting chamber adjacent said frusto-conoidal chamber for the regain of pressure from velocity as described.

10. The combination, with a frusto-conoidal chamber and a plate disposed adjacent thereto against which the water passing through said chamber impinges, said chamber having outlets adjacent said plate, of a collecting chamber of gradually increasing capacity in the direction of flow communicating with said outlet and having an outlet for discharging water therefrom, substantially as described.

11. A hydraucone elbow comprising a frusto-conoidal chamber forming the entrance to the elbow, a collecting chamber forming the bend and the discharge of the elbow, and a plate surrounded by said collecting chamber and disposed adjacent said frusto-conoidal chamber, whereby the water will be made to turn the bend without unnecessary losses, substantially as described.

12. A hydraucone elbow comprising a hydraucone regainer and a collecting chamber from said regainer forming the bend of the elbow, substantially as described.

13. The combination, with a section of conduit of gradually increasing capacity in the direction of flow, of a hydraucone elbow for the purposes described.

14. The combination, with a section of conduit of gradually increasing capacity in the direction of flow, of a hydraucone elbow communicating with the discharge from said conduit, and a section of conduit of gradually increasing capacity in the direction of flow communicating with the discharge from said elbow, substantially as described.

15. The combination, with a water wheel, of a discharge conduit leading from said wheel including a hydraucone elbow, substantially as described.

16. The combination, with a water wheel, of a discharge conduit leading from said wheel, including a section of conduit of gradually increasing capacity in the direction of flow and a hydraucone elbow communicating with said section, substantially as described.

17. The combination, with a water wheel, of a discharge conduit leading from said wheel including a section of conduit of gradually increasing capacity in the direction of flow, a hydraucone elbow communicating with the discharge from said section, and a section of gradually increasing capacity in the direction of flow communicating with the discharge from said elbow, substantially as described.

18. The combination of a closed conduit and a hydraucone regainer.

19. The combination with a hydraulic apparatus, of a hydraucone regainer communicating with the discharge end thereof.

20. The combination with a water wheel, of a hydraucone regainer communicating with the discharge end of said water wheel.

21. The combination with a water wheel, of a hydraucone regainer communicating with the discharge end of said wheel, and a conduit of gradually increasing capacity in the direction of flow communicating with the discharge end of said regainer.

22. The combination with a water wheel, of a conduit of gradually increasing capacity in the direction of flow, a collecting chamber below said conduit and having an outlet, a deflecting surface disposed in said chamber adjacent the end of said conduit to form an annular inlet to said chamber, and a conduit of gradually increasing capacity in the direction of flow communicating with the outlet to said chamber.

23. In combination with a water wheel, a conoidal chamber located at the discharge of the runner of said water wheel, the walls of said conoidal chamber curved outward to substantially radial, and a deflecting plate projected across the enlarged end of said conoidal chamber, said chamber having an annular discharge opening adjacent said plate, the radius of curvature of the conoidal wall being slightly greater than that of a free hydraucone, whereby velocity of water discharged from the water wheel runner may be changed to lower velocity and greater pressure at the discharge from the hydraucone, substantially as described.

24. In combination with a water wheel, a discharge passage increasing in capacity in the direction of flow, a deflecting plate projected across the end of said passage, a collecting chamber connecting with said discharge passage and inclosing and surrounding said deflecting plate, a discharge conduit from said chamber, whereby the water from the water wheel may be deflected from axial to substantially radial flow along, over, around and under said plate, said collecting chamber having a side outlet to discharge the water deflected by said plate, substantially as described.

25. In combination with a water wheel, a discharge passage increasing in capacity in the direction of flow, a deflecting plate projected across the end of said passage, a collecting chamber connecting with said discharge passage and inclosing and surrounding said deflecting plate, a discharge conduit gradually increasing in capacity in the direction of flow connecting with said collecting chamber, whereby the water from the water wheel may be deflected from axial to substantially radial flow along, over and around said plate and into said discharge conduit for the regain of pressure from velocity, substantially as described.

26. As a device, conoidal walls inclosing a chamber having a substantially circular inlet and a substantially annular outlet, the radius of curvature of the conoidal walls being such as to maintain within the chamber reactions of a free hydraucone, said annular outlet being of less area than the cross-sectional area measured at substantially right angles to the stream line of flow of the water of an intermediate portion of said chamber.

27. The combination, with a water wheel, of a discharge conduit leading from said wheel including a frusto-conoidal chamber having a substantially annular outlet, said annular outlet being of less area than the cross-sectional area measured at substantially right angles to the stream line of flow of the water of an intermediate portion of said frusto-conoidal chamber.

Signed at Chicago, Illinois, this 2nd day of July, 1915.

WILLIAM M. WHITE.

Witnesses:
  T. D. BUTLER,
  H. C. JACOBS.